United States Patent
DeLuca et al.

(10) Patent No.: US 9,354,807 B2
(45) Date of Patent: *May 31, 2016

(54) METHOD, APPARATUS AND COMPUTER PROGRAM TO DESIGNATE CONTENT RETRIEVAL ON AN INTERACTIVE DISPLAY

(71) Applicant: International Business Machines Corporation, Armonk, NY (US)

(72) Inventors: Lisa Seacat DeLuca, San Francisco, CA (US); Lydia M. Do, Raleigh, NC (US); Charles Marcel Kinard, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 218 days.

This patent is subject to a terminal disclaimer.

(21) Appl. No.: 13/967,418

(22) Filed: Aug. 15, 2013

(65) Prior Publication Data

US 2014/0149898 A1 May 29, 2014

Related U.S. Application Data

(63) Continuation of application No. 13/688,791, filed on Nov. 29, 2012.

(51) Int. Cl.
G06F 3/0488 (2013.01)
G06F 17/30 (2006.01)
G06F 9/44 (2006.01)

(52) U.S. Cl.
CPC ........ *G06F 3/0488* (2013.01); *G06F 17/30058* (2013.01); *G06F 8/34* (2013.01)

(58) Field of Classification Search
CPC ..................................................... G06F 3/0488
USPC ........................................................... 715/764
See application file for complete search history.

(56) References Cited

U.S. PATENT DOCUMENTS

| 3,651,509 | A | | 3/1972 | Ngo |
| 6,470,341 | B1 | * | 10/2002 | Rekimoto |
| 6,567,830 | B1 | * | 5/2003 | Madduri ................. 715/235 |
| 7,565,614 | B2 | * | 7/2009 | Hamano .............. G06F 17/242 715/753 |

(Continued)

FOREIGN PATENT DOCUMENTS

| EP | 1385336 | | 1/2004 |
| EP | 1385336 A2 | | 1/2004 |
| JP | 2011054096 A | * | 3/2011 |

OTHER PUBLICATIONS

Panasonic, "Operating Instructions Network Interactive Plasma Display", Model No. Th-65PB1U, 2012 (28 Pages).

(Continued)

*Primary Examiner* — Reza Nabi
*Assistant Examiner* — Daniel Rodriguez
(74) *Attorney, Agent, or Firm* — Harrington & Smith; Louis J. Percello

(57) ABSTRACT

Disclosed is a system configured, in response to a user placing one or more markings at a first location on a display screen, to create a mapping between data representing the one or more markings; to save the data in a file that is identified at least in part by the mapping; and in response to the user inputting a command to retrieve the markings, to retrieve the data from the file based on the mapping and to render markings on the display screen at a second location specified by the user.

19 Claims, 3 Drawing Sheets

(56) References Cited

U.S. PATENT DOCUMENTS

| | | | |
|---|---|---|---|
| 7,966,558 B2 | 6/2011 | Duncan et al. | |
| 8,473,492 B1* | 6/2013 | Biro | 707/736 |
| 2001/0000666 A1* | 5/2001 | Wood | G06F 3/03545 |
| | | | 345/179 |
| 2002/0059342 A1* | 5/2002 | Gupta et al. | 707/512 |
| 2003/0011578 A1* | 1/2003 | Bergovist | G06F 3/03545 |
| | | | 345/179 |
| 2004/0078757 A1* | 4/2004 | Golovchinsky et al. | 715/512 |
| 2005/0144229 A1* | 6/2005 | Kulkarni | H04L 12/1822 |
| | | | 709/204 |
| 2006/0168531 A1* | 7/2006 | Sato | G06F 3/038 |
| | | | 715/751 |
| 2007/0204224 A1 | 8/2007 | Kenagy | |
| 2008/0065619 A1* | 3/2008 | Bhogal | G06F 3/04883 |
| 2008/0313572 A1* | 12/2008 | Waldman et al. | 715/854 |
| 2010/0001962 A1 | 1/2010 | Doray et al. | |
| 2010/0262659 A1* | 10/2010 | Christiansen et al. | 709/205 |
| 2011/0007037 A1* | 1/2011 | Ogawa | G06F 3/03545 |
| | | | 345/179 |
| 2011/0248995 A1 | 10/2011 | Vaughan et al. | |
| 2012/0133989 A1* | 5/2012 | Glover | G06F 17/241 |
| | | | 358/1.18 |
| 2012/0282587 A1* | 11/2012 | Lofthus | G09B 3/00 |
| | | | 434/335 |
| 2013/0036358 A1* | 2/2013 | Takasugi | G06F 3/04883 |
| | | | 715/733 |
| 2013/0290416 A1* | 10/2013 | Nelson | G06Q 10/10 |
| | | | 709/204 |

OTHER PUBLICATIONS

Innosoft et al., "Multipurpose Internet Mail Extensions (MIME) Part Two: Media Types", Network Working Group, Request for Comments: 2046, Obsoletes: 1521, 1522, 1590, Catageory: Standards Track, RFC2046 Nov. 1996 (42 Pages).

"Smart Boards Keep Students Involved", The Indian Express, Journalism of Courage, four pages, Posted online Aug. 13, 2012, 00:22 hours, http://www.indianexpress.com/story-print/987501/.

* cited by examiner

3A: IN RESPONSE TO A USER PLACING ONE OR MORE MARKINGS AT A FIRST LOCATION ON A DISPLAY SCREEN, CREATING A MAPPING BETWEEN DATA REPRESENTING THE ONE OR MORE MARKINGS.

3B: SAVING THE DATA IN A FILE THAT IS IDENTIFIED AT LEAST IN PART BY THE MAPPING.

3C: IN RESPONSE TO THE USER INPUTTING A COMMAND TO RETRIEVE THE MARKINGS, RETRIEVING THE DATA FROM THE FILE BASED ON THE MAPPING AND RENDERING MARKINGS ON THE DISPLAY SCREEN AT A SECOND LOCATION SPECIFIED BY THE USER.

FIG. 3

METHOD, APPARATUS AND COMPUTER PROGRAM TO DESIGNATE CONTENT RETRIEVAL ON AN INTERACTIVE DISPLAY

CROSS-REFERENCE TO A RELATED PATENT APPLICATION

This patent application is a continuation patent application of copending U.S. patent application Ser. No. 13/688,791, filed Nov. 29, 2012, the disclosure of which is incorporated by reference herein in its entirety.

TECHNICAL FIELD

The exemplary embodiments of this invention relate generally to computer software, the visual display of information including text and images, user interfaces and devices including converged communications, touch screen and pen-based image creation and display systems, mobile and wireless applications, visualization and augmented reality software, as well as to collaborative applications, content management and Web technology including pervasive Web technologies.

BACKGROUND

Modern user interfaces can include large format electronic touch sensitive display panels used in conjunction with a pointing device embodied as an electronic "pen". One non-limiting example of this type of user interface is represented by Interactive Plasma Display (IPD) technology that includes an electronic pen system used with an interactive plasma display. In one exemplary type of IPD system the pen system enables multiple different pens to be distinguished and uniquely identified. For example, one pen may cause the plasma display to render a marking in one color (e.g., red) while another pen may cause the plasma display to render a marking in a different color (e.g., green). Different pens can also be associated with different users enabling markings made (in any color) by one user to be distinguished from a marking made by a different user. An IPD system can advantageously enable high-speed drawing/simultaneous multiple drawing with high image quality, and can also support wireless connections to multiple external devices such as PCs and/or tablet devices whereby a marking made on the display panel can be reproduced on the display of any connected external device(s).

SUMMARY

In a first aspect thereof the examples of the embodiments of this invention provide a method that comprises, in response to a user placing one or more markings at a first location on a display screen, creating a mapping between data representing the one or more markings; saving the data in a file that is identified at least in part by the mapping; and in response to the user inputting a command to retrieve the markings, retrieving the data from the file based on the mapping and rendering markings on the display screen at a second location specified by the user.

In another aspect thereof the examples of the embodiments of this invention provide a computer readable data storage medium that stores computer program instructions. Execution of the computer program instructions by at least one data processor results in performance of operations that comprise, in response to a user placing one or more markings at a first location on a display screen, creating a mapping between data representing the one or more markings; saving the data in a file that is identified at least in part by the mapping; and in response to the user inputting a command to retrieve the markings, retrieving the data from the file based on the mapping and rendering markings on the display screen at a second location specified by the user.

In yet a still further non-limiting aspect thereof the examples of the embodiments of this invention provide a system that comprises a touch responsive display screen; a controller connected with the touch responsive display screen; and a host system connected with the controller. The host system comprises a computer readable data storage medium storing computer program instructions connected with at least one data processor for executing the instructions. The at least one data processor is connected with at least one file storage medium and is configured to perform operations that comprise, in response to a user placing one or more markings at a first location on a display screen, creating a mapping between data representing the one or more markings; saving the data in a file that is identified at least in part by the mapping; and in response to the user inputting a command to retrieve the markings, retrieving the data from the file based on the mapping and rendering markings on the display screen at a second location specified by the user, where the second location differs from the first location, or is the first location where the one or more markings were placed on the display screen, or comprises multiple other locations on the display screen where the one or more markings were placed on the display screen, or is the first location where the one or more markings were placed on the display screen and one or more other locations on the display screen.

BRIEF DESCRIPTION OF THE SEVERAL VIEWS OF THE DRAWINGS

FIG. 2A shows an example of saving image content from an interactive display and subsequently retrieving and displaying the saved image content, and where FIG. 2B shows an example of performing a search based on a written generic search word and displaying corresponding search results to a user.

FIG. 3 is a logic flow diagram illustrative of a method and the operation of a computer program product in accordance with non-limiting embodiments of this invention.

DETAILED DESCRIPTION

For convenience the embodiments of this invention will be described in the context of an IPD system. It should be appreciated however that the embodiments of this invention are not limited for use with any particular type of display technology. For example, and as non-limiting embodiments, the display technology could be based on a touch-sensitive plasma display system, or it could be based on a touch-sensitive liquid crystal display (LCD) system, or on a cathode ray tube (CRT) type of display system having an ability to detect the proximity of a pointing device. The pointing device could be any type of device that can be sensed by the touch-sensitive display including, but not limited to, an electronic pen or stylus, a non-electronic pens or stylus, or even the finger of a user. The electronic pen can have at least unidirectional wireless (RF or IR) connectivity to the display screen so that a location of the pen tip relative to a display screen coordinate system can be detected. The wireless connectivity can also enable individual pens to be uniquely identified and distinguished by the display system, such as if each pen transmits a specific radio frequency, or transmits a unique identification code.

One exemplary and non-limiting type of display system, specifically an IPD system, suitable for use in implementing the embodiments of this invention is described in a document: "Operating Instructions Network Operations Interactive Plasma Display, Model No.: TH-65PB1U, 2012, Panasonic®.

The embodiments of this invention beneficially leverage a pen system with the interactive nature of a display and provide an ability to designate content placement and retrieval onto the display. Content is populated as a user or users draw onto the display. However, and in opposition to the use of conventional static whiteboards, it is no longer required that content remain only at the position where the content is first placed. Instead, if it is desirable to move some content from a first position to a second position the content can be saved and subsequently retrieved to the second position.

The embodiments of this invention also enable a user to retrieve and display some other content, such as image content retrieved from the Web. The image content can be a static image or a video.

Figure 1:
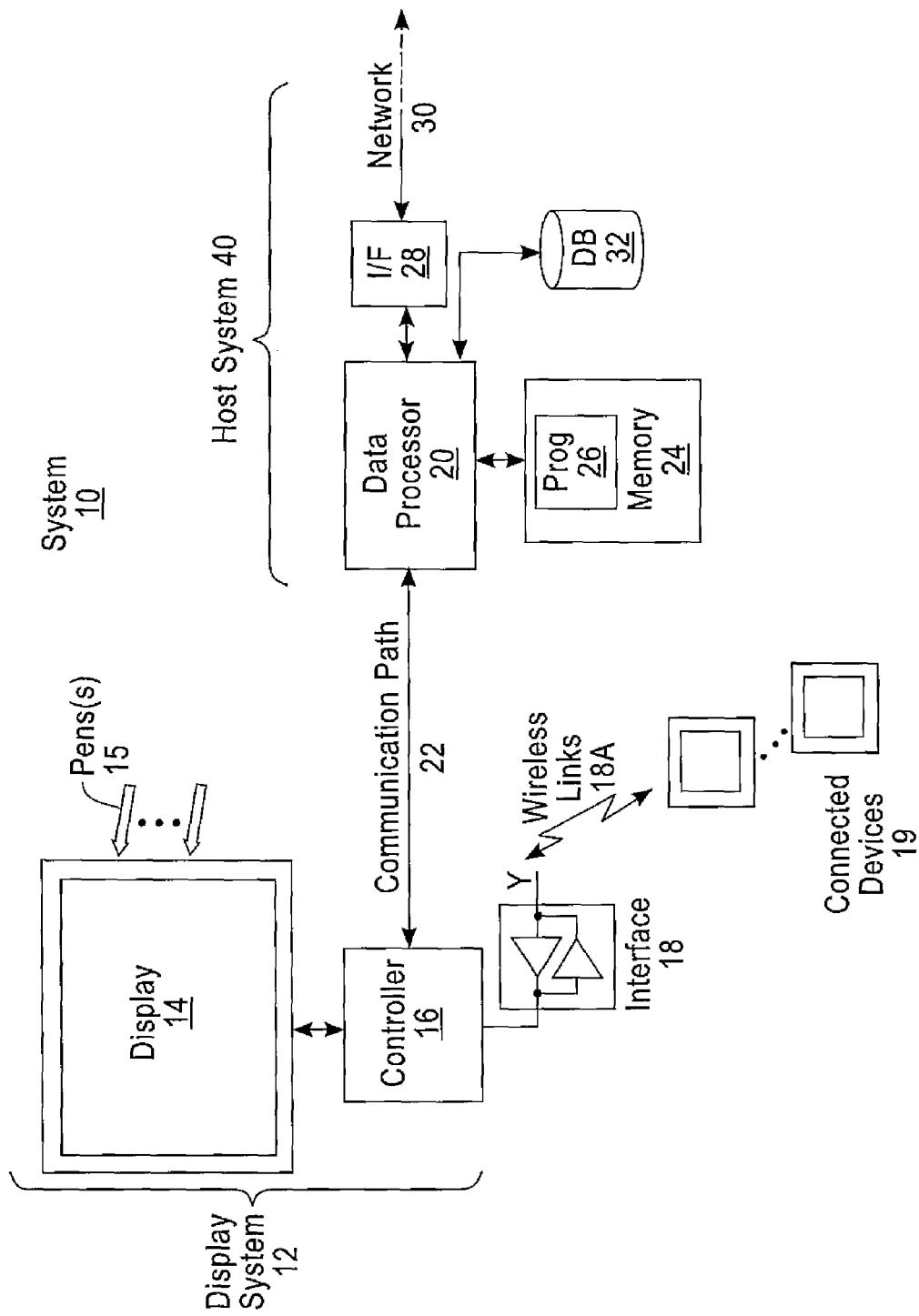
FIG. 1 is a simplified block diagram of a system that is suitable for implementing the various examples of embodiments of this invention, where the system includes a touch sensitive display system and a host system.

FIG. 1 shows a simplified block diagram of a system 10 that is suitable for implementing the various examples of embodiments of this invention. The system 10 is assumed to include a display system 12 that includes a touch sensitive display 14, such as a plasma display, or an LCD, or a CRT display as examples. One or more pens 15, such as electronic pens that transmit wireless signals, can be provided. A controller 16 can be integrated with or provided separate from the display 14 and functions to generally control the sensing of the type/identity and position of the pen 15 relative to the surface of the display 14 and to render corresponding markings on the display 14, such as various color markings depending on the specific pen 15 that is used. The controller 16 can be implemented using, for example, one or more microprocessors connected with program and data storage memory (not shown). The display system 12 also includes at least one interface to external devices, such as a wireless interface 18 to one or more connected devices 19 implemented using wireless links 18A (e.g., Bluetooth™). The connected devices 19 could be, for example, personal computers (PCs), laptop computers, tablet-based computers and/or smartphones. As an example, an image displayed on the display 14 can be transmitted to the connected devices 19 for display on a local associated display.

A separate interface can be provided to establish a communication path 22 from the controller 16 to a host system 40 such as one embodied in a PC or a work station. The host system 40 can include at least one data processor 20 connected with a memory 24 that stores data and at least one program 26 that is configured so as to implement the embodiments of this invention. Connected with the data processor 20 is an interface (I/F) 28 for connecting to a network 30, such as a local area network (LAN), a wireless LAN (WLAN), and/or a wide area network (WAN) such as the Internet. An optional local or remote database (DB) 32 can be included and connected with the data processor 20 for the storage of user-generated content and other data as will be described below.

In some embodiments the communication path 22 can be a part of the network 30. In some embodiments the communication path 22 can be implemented using the wireless links 18A. In some embodiments the communication path 22 can be a dedicated signal path for connecting the display system 12 to the host system 40. In some embodiments the display system 12 can be an off-the-shelf display system, such as a commercially available IPD, and is interfaced to the host system 40 via the communication path 22. In some embodiments the functionality of the host system 40 can be integrated with the functionality of the display system 12. In this case the display system 12 as provided to a user can implement the conventional pen sensing and display functionality of the display system as well as the enhanced functionality made possible by the use of the embodiments of this invention. The overall system 10 can find use in a number of exemplary environments including, but not limited to, educational environments (as a replacement for the conventional blackboard and chalk) and business/enterprise environments (as a replacement for a conventional whiteboard and erasable marker(s)).

Figure 2A:
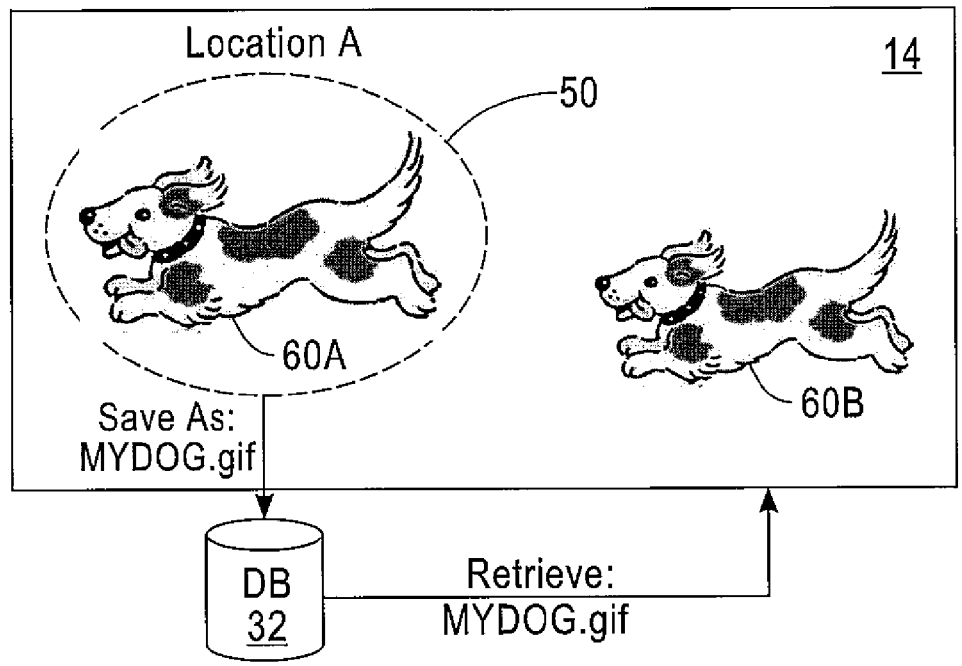
FIGS. 2A and 2B depict examples of use cases for the system of FIG. 1, where
Figure 2B:
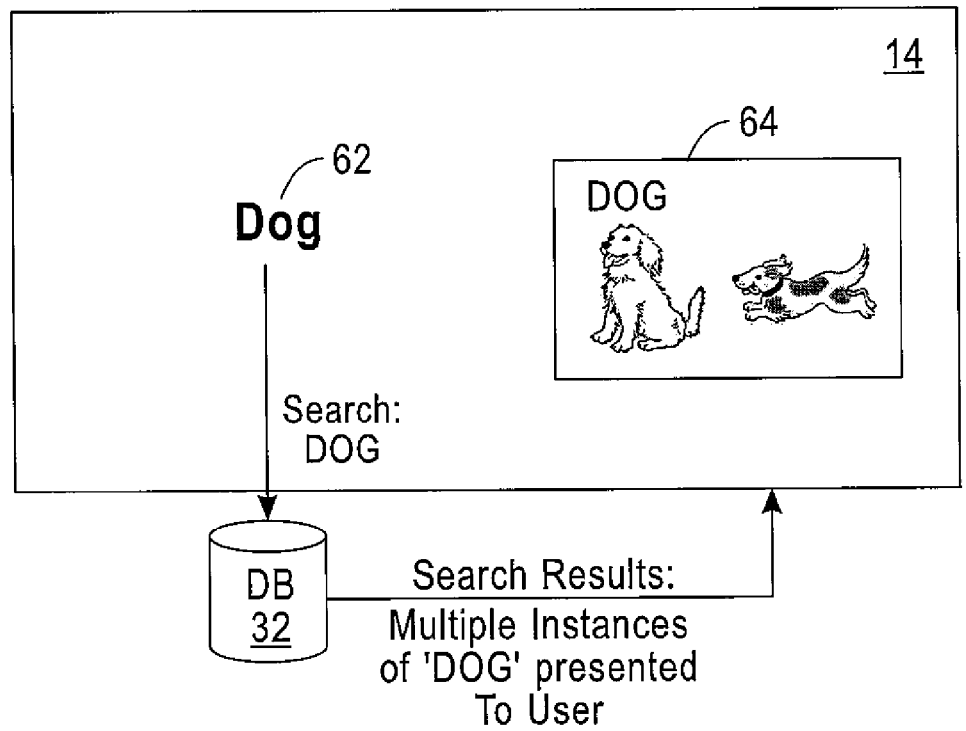

Some examples of use cases for the system 10 are discussed now in relation to FIGS. 2A and 2B.

In FIG. 2A the user writes or draws on the (IPD) display 14 and creates what can be referred to as 'markings' that are displayed on the screen of the display 14. The user can save markings appearing on the entire screen display or on one or more sections of the screen display. In the example of FIG. 2A it can be assumed that the user has created using a pen 15 various markings that form an image (content) 60A that represents a dog. The user can then designate the content to be saved, such as by drawing a line 50 around the content 60A, or by tapping or double tapping within the image 60A, as two non-limiting examples. Further, the selection of content to be saved can be implemented such that all rendered content related to some particular pen color is selected and saved. For example, if a certain user is rendering content with a 'blue' pen color then the command to save content (e.g., double-tapping with the blue pen at some location) causes all rendered 'blue' content to be saved.

Having thus identified to host system 40 by some means the image 60A that is desired to be saved the host system 40 can then, in one non-limiting embodiment, prompt the user on the display 14, via the communication path 22 and controller 16, to provide a specific, descriptive name for a file to contain the data representing the image to be saved and possibly also a file type. In this example the user responds by entering (e.g., writing on the display screen) a name for my 'mydog' (e.g., "Spot"), which may be saved by default as, for example, a .gif file type or as any suitable file type. The file name (e.g., "Spot") could be entered by the user on the display 14 using the pen 15 and subsequently recognized by the host system 40 using any suitable type of handwriting recognition algorithm. The prompting and data entry could occur in some predetermined portion of the area of the display 14, e.g., in a box in the lower-right corner, or at any convenient location such as directly adjacent to the designated image content 60A.

In some embodiments, and should the user fail to input a specific file name, a default condition can be to use as a non-limiting example optical character recognition (OCR) to translate a portion of text or image to provide or suggest, for example, a unique name, or a general name, or a temporary name (e.g., in cache) until the user specifies a specific file name.

In some non-limiting embodiments the content can be saved under a user name alone or under the user name with some additional contextual information such as time, date and/or location. As one non-limiting example, and as will be discussed in further detail below, if a certain pen such as the 'red' pen is identified with a particular user or group of users, e.g., "Sally", or "Marketing", then all content created using the red pen can be saved and later recalled under that user identification, e.g., "filename: Marketing, date, time, Conference Room A".

In some embodiments this user interface could be or could include an audio user interface such as one using speech synthesis and/or speech recognition algorithms in conjunction with suitable audio transducer(s). For example, the user is prompted to provide a name for the saved image data through an announcement made by a speech synthesis system via a loudspeaker, and the user replies by speaking the name that is captured by a microphone and the generated audio signal is converted to text.

In response to the user input by whatever means the host system 40 saves the image content 60A under the specified filename, e.g., 'mydog.gif.' The image content can be saved in the memory 24 or in the database 32. The content can also be saved via the network 30 to some remote (e.g., cloud-based) data storage medium. When the image content 60A is saved the displayed image can be automatically removed from the display 14 or it can be retained, as desired by the user. The saved image content can be for a specific instance of an object, e.g., 'mydog', or for a generic instance of an object, e.g., 'dog'.

Subsequently the user can issue a command to retrieve the content from storage and can designate a (second) location, such as by tapping on the surface of the display 14, at which to restore (re-display) the retrieved content. In response to the user providing a name, which can be selected from a list of names (a list of file names previously stored) provided by the host system 40 on the display 14, the host system 40 retrieves the corresponding stored image content and sends it to the display system 12 to be displayed at the designated location as the image content 60B.

The second location can be any location on the display screen 14. For example, the user could replicate the image instance at one or at multiple locations on the display screen 14. Further by example the image could be recalled and reproduced at the first location (origin of capture) if some time period has elapsed (e.g. later in time or context). As such, the 'second location' can be construed to be the original location where the content was placed on the display screen 14, or one other location on the display screen 14, or multiple other locations on the display screen 14, or the original location and one or more other locations on the display screen 14.

FIG. 2B illustrates another exemplary embodiment of this invention. In this embodiment the user can write on the display 14 (or speak depending on the specifics of the user interface) a word or phrase 62 such as the generic word: "Dog". The image data corresponding to the entered word or phrase 62 can be sent to the host system 40 where handwriting recognition software (or speech recognition software) stored in the memory 24 recognizes the written word or phrase. In response the memory 24 or the database 32 can be searched using the generic word "Dog". Assuming that search results are generated then possibly multiple instances of dog images 64 can be presented to the user on the display 14 enabling the user to select one or more of the images. At this point the user could also save a specific displayed dog image instance using the procedure depicted in FIG. 2A, and could rename the saved specific instance and subsequently recall and redisplay the saved specific instance of the dog image.

In the embodiment of FIG. 2B the search can be made of various dog images saved by one or more users according to the procedure of FIG. 2A. Alternatively the search can be conducted via the network 30 to locate one or more dog images from one or more Web-based image repositories. For example, the user could be presented with a plurality of clipart images that are retrieved from the Web and that correspond to the generic category: 'Dog'.

It should be pointed out that the user may be enabled to specify a search location for conducting the search. The search location could be, by example, a site associated with a brand, or a social networking site. The returned instance or instances of the search result could be a static image, or a video clip, or a link to a video such as a documentary produced by some third party as several non-limiting examples. If a video clip or video is returned it can be streamed from the host system 40 to the display system 12 for viewing on all or a portion of the display 14.

In accordance with a further aspect of the embodiments of this invention certain capabilities of the pens 15 can be leveraged to enhance the user interface capabilities. For example, the use of a 'blue' pen can be interpreted to save the image content 60A to a drop box, the use of a 'red' pen can be interpreted to save the image content 60A to the cloud, while the use of a 'green' pen can be interpreted to save the image content 60A to one or more of the connected devices 19. In other embodiments the use of the 'green' pen to write a word or words on the display 14 can be interpreted as a command to retrieve a file identified by the word or words. In other embodiments the command(s) can be gesture-based where, as non-limiting examples, a user drawing a line from a drawn image towards the edge of the display can be interpreted as a command to 'save-off' the image to storage and to prompt the user to enter a descriptive (file) name for the saved content, while the user drawing a line from the edge of the display 14 to a written word or words can be interpreted as a command to retrieve a stored file having a name matching the written word or words.

In all of these various examples the content is saved off, mapped, and indexed as items that can be recalled at a later time. At a later time the user writes or draws on the display 14 at a particular location and the host system 40 retrieves/pulls up the matched content onto the display 14 at the location where the user is writing/drawing. For example, the user starts to write the name of an image file: "mydog.gif", and the host system 40 replaces the written text/symbols with the corresponding retrieved image as in FIG. 2A. As another example the user writes a generic category (as text) or draws a generic image on the screen: "DOG", and the host system 40 displays to the user the various images in that generic category giving the user the opportunity to select a pertinent image (as in FIG. 2B). As another example the user writes a brand name on the IPD or the name of a social networking site, as two non-limiting examples, and the host system 40 creates an embedded object that is linked to a Web site associated with the brand name (e.g., 'www.brandname.com') or with the social networking site (e.g., 'www.social network.com').

In general, the above mentioned mapping and indexing can be, by example, user-specific (tied to the identity of the user or users); content specific (tied to the type of content on the display); and/or context-specific (tied to one or more of the time, date, location and/or condition(s) under which the content is saved.)

Once established, meta-data can be used to retrieve context from any number of possible locations, including local or remote memory and/or from a location reachable via the web or any networked content source.

The various non-limiting examples of embodiments of this invention encompass an automatic discovery of a mapping (e.g., user-specific, content-specific, context specific) on the display 14 and/or associated connected devices 19 (e.g., laptops or PCs via Bluetooth, etc.). If no mapping is discovered then the user is allowed and can be prompted to create a mapping/index.

Various methods for content typing and look-up include using the mapping system, which forms a part of the program 26, to automatically create content associations. If no mapping exists a look-up by filename (referencing files saved off of the system or connected devices 19) can be attempted. In addition MIME (discussed below) or some equivalent mechanism can be used to determine content type (e.g., use a file header to look-up content-id and content-type). It is also within the scope of the embodiments of this invention to find matching images based on tags or keywords. Furthermore, a file system may be presented to the user to enable the user to navigate to a folder and file of interest.

In general, the above-mentioned mapping and indexing can also be, for example, based on at least one of a recognition of information conveyed by at least one marking made by the user, pixel locations on the display screen that correspond to the at least one marking and pixel attributes including color, such as a color associated with a particular one of the pens 15.

As was noted above there are various methods that can be used for determining content type and look-up. For example, the mapping system that forms a part of the program 26 of FIG. 1 can be used create content associations. If there is no mapping created then the system 40 can perform a look-up by the file name by referencing those files saved to the memory 24, and/or the database 32, and/or to some external (e.g., cloud) storage medium, and/or to one or more of the connected devices 19. The mapping system can utilize, for example, MIME types (e.g., see N. Freed, N. Borenstein, Request for Comments (RFC): 2046, November 1996: "Multipurpose Internet Mail Extensions (MIME) Part Two: Media Types") to determine content type by performing, for example, a file header to look-up the content-id and content-type. The host system 40 can also find matching images based on tags or keywords supplied by a user. In these various embodiments a file system can be presented to the user on the display 14 who can then navigate to a folder and file of interest. In various non-limiting examples of use cases the user is enabled by to retrieve a specific file, or to retrieve a generic category of content by interacting with the user interface of the display system 12. The exemplary embodiments of this invention provide an ability to recall content saved from a display system based on tags/metadata. The use of these embodiments can benefit at least display system providers as well as software application providers having access to application program interfaces (APIs) and/or other programming interfaces for the display system 12 to enable the rendering of the retrieved content.

Referring to FIG. 3 the embodiments of this invention provide a method, a computer program product, a system and structure configured to, (Block 3A) in response to a user placing one or more markings at a first location on a display screen, creating a mapping between data representing the one or more markings. At Block 3B there is a step of saving the data in a file that is identified at least in part by the mapping. At Block 3C there is a step performed, in response to the user inputting a command to retrieve the markings, retrieving the data from the file based on the mapping and rendering markings on the display screen at a second location specified by the user.

The method, computer program product, system and structure as in FIG. 3, where the second location differs from the first location, or is the first location where the one or more markings were placed on the display screen, or comprises multiple other locations on the display screen where the one or more markings were placed on the display screen, or is the first location where the one or more markings were placed on the display screen and one or more other locations on the display screen.

The method, computer program product, system and structure as in FIG. 3, where creating the mapping comprises at least one of using meta-data descriptive of at least one characteristic of an image formed by the markings, user-specific meta-data, content specific meta-data, and context-specific meta-data.

The method, computer program product, system and structure as in FIG. 3, where creating the mapping uses a mapping system to automatically create content associations, and where if no automatically created content associations exist then the method, computer program product, system and structure operate to retrieve a file containing content by filename, or retrieve a file by using information contained in the file to determine at least one of a content-id and a content-type, or retrieve a file based on tags or keywords, or retrieve a file selected by a user from a display of file-system related information.

The method, computer program product, system and structure as in FIG. 3, and further comprising in response to a user inputting a name for an object, conducting a search using the name and rendering on the display screen multiple instances of specific objects located during the search using the name.

The method, computer program product, system and structure as in FIG. 3, and further comprising in response to a user inputting an identification of a site reachable through a data communications network, accessing the site and rendering on the display screen at least one of a static image or a video obtained from the site.

The method, computer program product, system and structure as in FIG. 3, where the display screen is a touch responsive display screen, and where placing the at least one marking and inputting the command comprise the user interacting with the touch responsive display screen, where the user interacts with the touch sensitive display screen using at least one pen.

The method, computer program product, system and structure as in FIG. 3, where the mapping is based on at least one of a recognition of information conveyed by the at least one marking, pixel locations on the display screen that correspond to the at least one marking and pixel attributes including color.

The method, computer program product, system and structure as in FIG. 3, and further comprising examining stored files to determine a type of content stored in the files, selecting a file or files that have a type of content matching a type of content that is indicated by the user, and rendering content on the display screen from the selected file or files.

The method, computer program product, system and structure as in FIG. 3, and further comprising displaying a file system to the user on the display screen, accessing a file or files selected by the user from the displayed file system, and rendering content on the display screen from the selected file or files.

The method, computer program product, system and structure as in FIG. 3, where the mapping is based on an identification of the at least one marking that is entered by the user.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a 'circuit', a 'module' or a 'system'. Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on a single local computer, partly on the local computer, as a stand-alone software package, partly on the local computer and partly on a remote computer or entirely on the remote computer or server. In the latter scenario, the remote computer may be connected to the local computer through any type of network, including a LAN or a WAN, or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As such, various modifications and adaptations may become apparent to those skilled in the relevant arts in view of the foregoing description, when read in conjunction with the accompanying drawings and the appended claims. As but some examples, the use of other similar or equivalent mathematical expressions may be used by those skilled in the art. However, all such and similar modifications of the teachings of this invention will still fall within the scope of this invention.

What is claimed is:

1. A system, comprising:
a touch responsive display screen;
a controller connected with the touch responsive display screen; and
a host system connected with the controller, the host system comprising a computer readable data storage medium storing computer program instructions connected with at least one data processor for executing the instructions, the at least one data processor being connected with at least one file storage medium and configured to perform operations that comprise,
in response to a user placing one or more markings at a first location on a display screen, creating a mapping between data representing the one or more markings;
saving the data in a file that is identified at least in part by the mapping; and
in response to the user inputting a command to retrieve the markings, retrieving the data from the file based on the mapping and rendering markings on the display screen at a second location specified by the user;
where the display screen is a touch responsive display screen associated with a display screen system, where placing the at least one marking, and inputting the command comprise the user interacting with the touch responsive display screen, where the user interacts with the touch sensitive display screen using at least one pen selected from a plurality of types of pens each associated with a signal detectable by the display screen system, where a particular type of pen is associated with a signal that in part uniquely identifies the type of pen from others of the plurality of types of pens; and where
a first storage location for the file to be saved in is selected by the data processor when a pen that is a first type of pen is used to designate at least a portion of the one or more markings to be saved, and a second storage location for the file to be saved in is selected by the data processor when a pen that is a second type of pen is used to designate at least a portion of the one or more markings to be saved, where the first storage location is different than the second storage location, and where at least one of the first storage location and the second storage location is contained in a memory that is remotely located relative to the display screen system and that is connected to the data processor through an interface via at least one of a local area network (LAN), a wireless LAN (WLAN), and a wide area network (WAN); and where
for a case where there are a plurality of markings on the display screen where a first one or more of the plurality of markings were made with the first type of pen and where a second one or more of the plurality of markings were made with the second type of pen, in response to the user making a save content indication on the touch sensitive display screen using one of the first type of pen or the second type of pen, saving by the at least one data processor in the first storage location or in the second storage location, respectively, only those markings on the display screen that were made using the type of pen that was used to make the save content indication on the touch sensitive display screen; and where
the save content indication is comprised of a multi-tap indication made at a predetermined location on the display screen.

2. The system as in claim 1, where the second location differs from the first location, or is the first location where the one or more markings were placed on the display screen, or comprises multiple other locations on the display screen where the one or more markings were placed on the display screen, or is the first location where the one or more markings were placed on the display screen and one or more other locations on the display screen.

3. The system as in claim 1, where the operation of creating the mapping comprises at least one of using meta-data descriptive of at least one characteristic of an image formed by the markings, user-specific meta-data, content specific meta-data, and context-specific meta-data.

4. The system as in claim 1, where the operation of creating the mapping uses a mapping system to automatically create content associations.

5. The system as in claim 4, where if no automatically created content associations exist then the system performs an operation of retrieving a file containing content by filename, or retrieving a file by using information contained in the file to determine at least one of a content-id and a content-type, or retrieving a file based on tags or keywords, or retrieving a file selected by a user from a display of file-system related information.

6. The system as in claim 1, further comprising operations that are performed, in response to a user inputting a name for an object, of conducting a search using the name and rendering on the display screen multiple instances of specific objects located during the search using the name.

7. The system as in claim 1, further comprising operations that are performed, in response to a user inputting an identification of a site reachable through a data communications network, of accessing the site and rendering on the display screen at least one of a static image or a video obtained from the site.

8. The system as in claim 1, where when the user makes a marking using the first type of pen the marking is displayed with a first color, and when the user makes a marking using the second type of pen the marking is displayed with a second color that differs from the first color.

9. The system as in claim 1, where the mapping is based on at least one of recognition of information conveyed by the at least one marking, pixel locations on the display screen that correspond to the at least one marking and pixel attributes including color.

10. The system as in claim 1, further comprising operations of examining stored files to determine a type of content stored in the files, selecting a file or files that have a type of content matching a type of content that is indicated by the user, and rendering content on the display screen from the selected file or files.

11. The system as in claim 1, further comprising operations of displaying a file system to the user on the display screen, accessing a file or files selected by the user from the displayed file system, and rendering content on the display screen from the selected file or files.

12. The system of claim 1, where the mapping is based on an identification of the at least one marking that is entered by the user.

13. The system of claim 1, where the host system is one of separate from the controller and the touch responsive display screen or is integrated with the controller and the touch responsive display screen, and where the file storage medium is embodied as one or more of a local memory and a remote memory accessed via a data communications network.

14. The system of claim 1, where the file storage medium is embodied as a cloud-based data storage medium.

15. A system, comprising:
a touch responsive display screen;
a controller connected with the touch responsive display screen; and
a host system connected with the controller, the host system comprising a computer readable data storage medium storing computer program instructions connected with at least one data processor for executing the instructions, the at least one data processor being connected with at least one file storage medium and configured to perform operations that comprise, in response to a user placing one or more markings at a first location on a display screen,
creating a mapping between data representing the one or more markings;
saving the data in a file that is identified at least in part by the mapping; and
in response to the user inputting a command to retrieve the markings, retrieving the data from the file based on the mapping and rendering markings on the display screen at a second location specified by the user,
where the second location differs from the first location, or is the first location where the one or more markings were placed on the display screen, or comprises multiple other locations on the display screen where the one or more markings were placed on the display screen, or is the first location where the one or more markings were placed on the display screen and one or more other locations on the display screen,
where the mapping comprises at least one of using metadata descriptive of at least one characteristic of an image formed by the markings, user-specific meta-data, content specific meta-data, context-specific meta-data, a recognition of information conveyed by the at least one marking, pixel locations on the display screen that correspond to the at least one marking and pixel attributes including color;
where the display screen is a touch responsive display screen associated with a display screen system, where placing the at least one marking, and inputting the command comprise the user interacting with the touch responsive display screen, where the user interacts with the touch sensitive display screen using at least one pen selected from a plurality of types of pens each associated with a signal detectable by the display screen system, where a particular type of pen is associated with a signal that in part uniquely identifies the type of pen from others of the plurality of types of pens; and where
a first storage location for the file to be saved in is selected by the at least one data processor when a pen that is a first type of pen is used to designate at least a portion of the one or more markings to be saved, and a second storage location for the file to be saved in is selected by the at least one data processor when a pen that is a second type of pen is used to designate at least a portion of the one or more markings to be saved, where the first storage location is different than the second storage location, where at least one of the first storage location and the second storage location is contained in a device separate from the display screen system, where the device is connected via a wireless link to the display screen system; and where
for a case where there are a plurality of markings on the display screen, where a first one or more of the plurality of markings were made with the first type of pen and where a second one or more of the plurality of markings were made with the second type of pen, in response to the user making a save content indication on the touch sensitive display screen using one of the first type of pen or the second type of pen, saving by the at least one data processor in the first storage location or in the second storage location, respectively, only those markings on the display screen that were made using the type of pen that was used to make the save content indication on the touch sensitive display screen; and where
the save content indication is comprised of a multi-tap indication made at a predetermined location on the display screen.

16. The system as in claim 15, where creating the mapping uses a mapping system to automatically create content associations, and where if no automatically created content associations exist then the method retrieves a file containing content by filename, or retrieves a file by using information contained in the file to determine at least one of a content-id and a content-type, or retrieves a file based on tags or keywords, or retrieves a file selected by a user from a display of file-system related information.

17. The system as in claim 15, where the operations further comprise at least one of, in response to a user inputting a name for an object, conducting a search using the name and rendering on the display screen multiple instances of specific objects located during the search using the name, and in response to a user inputting an identification of a site reachable through a data communications network, accessing the site via a data communications network and rendering on the display screen at least one of a static image or a video obtained from the site, and at least one of examining files stored in the file storage medium to determine a type of content stored in the files, selecting a file or files that have a type of content matching a type of content that is indicated by the user, and rendering content on the display screen from the selected file or files, and displaying a file system to the user on the display screen, accessing a file or files selected by the user from the displayed file system, and rendering content on the display screen from the selected file or files.

18. The system as in claim 15, where the host system is one of separate from the controller and the touch responsive display screen or is integrated with the controller and the touch responsive display screen, and where the file storage medium is embodied as one or more of a local memory and a remote memory accessed via a data communications network.

19. The system as in claim 15, where the file storage medium is embodied as a cloud-based data storage medium.

* * * * *